US007802010B1

United States Patent
Oehrke

(10) Patent No.: US 7,802,010 B1
(45) Date of Patent: Sep. 21, 2010

(54) COMPUTER NETWORK METHOD AND SYSTEM FOR GUARANTEED MESSAGING SERVICE

(75) Inventor: Terry L. Oehrke, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2790 days.

(21) Appl. No.: 09/594,070

(22) Filed: Jun. 14, 2000

(51) Int. Cl.
*G06F 15/16* (2006.01)

(52) U.S. Cl. ............... 709/238; 709/239; 709/227; 709/225

(58) Field of Classification Search ........... 709/239, 709/206, 202, 238, 204, 205, 207, 227; 714/4, 714/11; 370/225
See application file for complete search history.

(56) References Cited

U.S. PATENT DOCUMENTS

| | | | | |
|---|---|---|---|---|
| 5,435,003 A | * | 7/1995 | Chng et al. ............... | 714/4 |
| 5,974,122 A | * | 10/1999 | Nelson et al. ............ | 379/100.09 |
| 6,047,331 A | * | 4/2000 | Medard et al. ............ | 709/239 |
| 6,108,709 A | * | 8/2000 | Shinomura et al. ........ | 709/239 |
| 6,130,875 A | * | 10/2000 | Doshi et al. .............. | 370/225 |
| 6,237,027 B1 | * | 5/2001 | Namekawa ............... | 709/206 |
| 6,411,991 B1 | | 6/2002 | Helmer et al. | |
| 6,438,583 B1 | * | 8/2002 | McDowell et al. ......... | 709/206 |
| 6,460,073 B1 | * | 10/2002 | Asakura .................. | 709/206 |
| 6,542,934 B1 | * | 4/2003 | Bader et al. .............. | 709/239 |
| 6,859,821 B1 | * | 2/2005 | Ozzie et al. .............. | 709/205 |
| 2001/0036822 A1 | * | 11/2001 | Mead et al. .............. | 455/414 |

OTHER PUBLICATIONS

Harry Newton, Newton's Telecom Dictionary, Feb. 2002, CMP Books, 18th Edition, p. 659.*
"DNS (domain name system)". Downloaded from http://web.archive.org/web/20000307002913/whatis.com/dns.htm on Aug. 17, 2007. Posted Feb. 29, 2000.*

* cited by examiner

*Primary Examiner*—William C Vaughn, Jr.
*Assistant Examiner*—Scott Christensen

(57) ABSTRACT

A system and method for reliable messaging is provided. Instead of returning a message as undeliverable, the message is routed to a relay server. The relay server attempts to re-send or re-route the message to the destination server. Once the destination server and associated connection becomes operational, the relay server provides the message to the destination server. If the attempts to re-send or re-route the message time out or do not succeed after a certain number of attempts, the relay server may invoke a process to create another messaging server. The other messaging server substitutes for the original destination server and processes the message for the receiving user. In either situation, the message is provided to the receiving user.

15 Claims, 3 Drawing Sheets

COMPUTER NETWORK METHOD AND SYSTEM FOR GUARANTEED MESSAGING SERVICE

RELATED APPLICATIONS

Not Applicable

FEDERALLY SPONSORED RESEARCH OR DEVELOPMENT

Not Applicable

MICROFICHE APPENDIX

Not Applicable

BACKGROUND OF THE INVENTION

1. Field of the Invention

This invention generally relates to messaging in computer networks. In particular, the invention relates to a method and system for providing a guaranteed messaging service on an IP network.

2. Description of the Prior Art

Computer network messaging, such as e-mail, is provided by Internet Protocol (IP) networks or other networks of computers or processors operating pursuant to other protocols. For IP networks, messaging is performed pursuant to various further protocols, such as Simple Mail Transfer Protocol (SMTP), Post Office Protocol 3 (POP3), and Internet Message Access Protocol 4 (IMAP4).

Intranets or local computer networks may provide messaging services. For example, IP messaging using SMTP and POP3/IMAP4 is provided by a single messaging server. However, if the server or a connection to the messaging server is not operational, messaging between two users of the server may be interrupted. A message sent by a sender to another user is returned to the sender as undeliverable.

The Internet comprises an IP network that spans large regions or the entire globe for interconnecting a plurality of intranet networks. Messaging is delivered from on location to a remote location via the Internet. Given the size of the Internet, numerous opportunities for messaging to be miss routed, delayed and/or never delivered are provided. In some of these circumstances, the messaging is lost. Furthermore, if the destination messaging server or a connection to the messaging server is not operational, the messaging may be interrupted. A message sent by a sender to another user via the Internet is returned to the sender as undeliverable.

The present invention is directed to improvements that provide local and remote messaging without the return of a message as undeliverable.

SUMMARY OF THE INVENTION

The present invention is defined by the following claims, and nothing in this section should be taken as a limitation of those claims. By way of introduction, the preferred embodiment of the present invention described below relates to reliable messaging within a computer network, whether the network is a local area network or a wide area network. Instead of returning a message as undeliverable, the message is routed to a relay server. The relay server attempts to re-send or re-route the message to the destination server. Once the destination server and associated connection becomes operational, the relay server provides the message to the destination server. If the attempts to re-send or re-route the message time out or do not succeed after a certain number of attempts, the relay server may invoke another messaging server. The other messaging server substitutes for the original destination server and processes the message for the receiving user. In either situation, the message is provided to the receiving user.

In a particular first aspect of the invention, a computer network and method for providing a messaging service on the computer network is provided. A message is routed to a messaging server. When the message is undeliverable to the messaging server, the message is provided to a relay server. The relay server re-routes the message to the messaging server.

In a second aspect of the invention, another messaging server is invoked with the message is undeliverable to the messaging server after the message is re-routed by the relay server. The message is then provided to the other messaging server for processing and communication to the recipient.

DETAILED DESCRIPTION OF PREFERRED EMBODIMENTS

Figure 1:
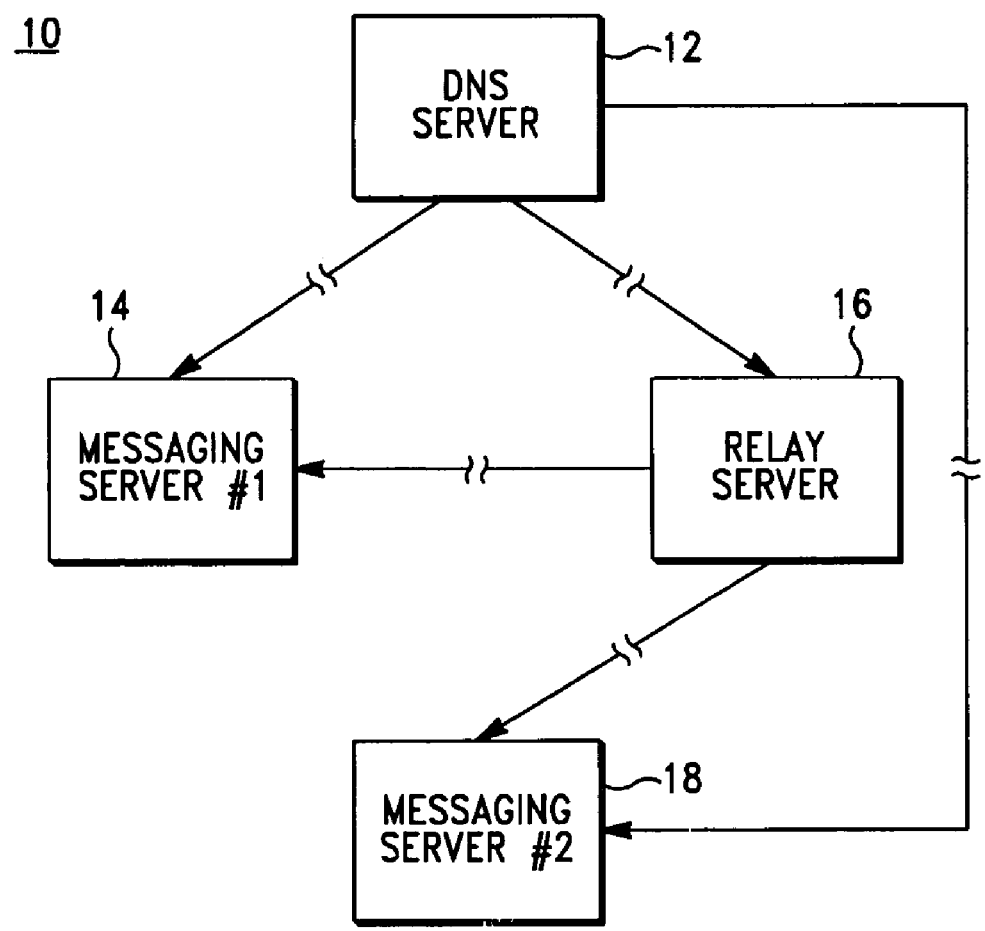
FIG. 1 is schematic block diagram of one embodiment of a computer network for providing a messaging service in accordance with the present invention.
Figure 3:
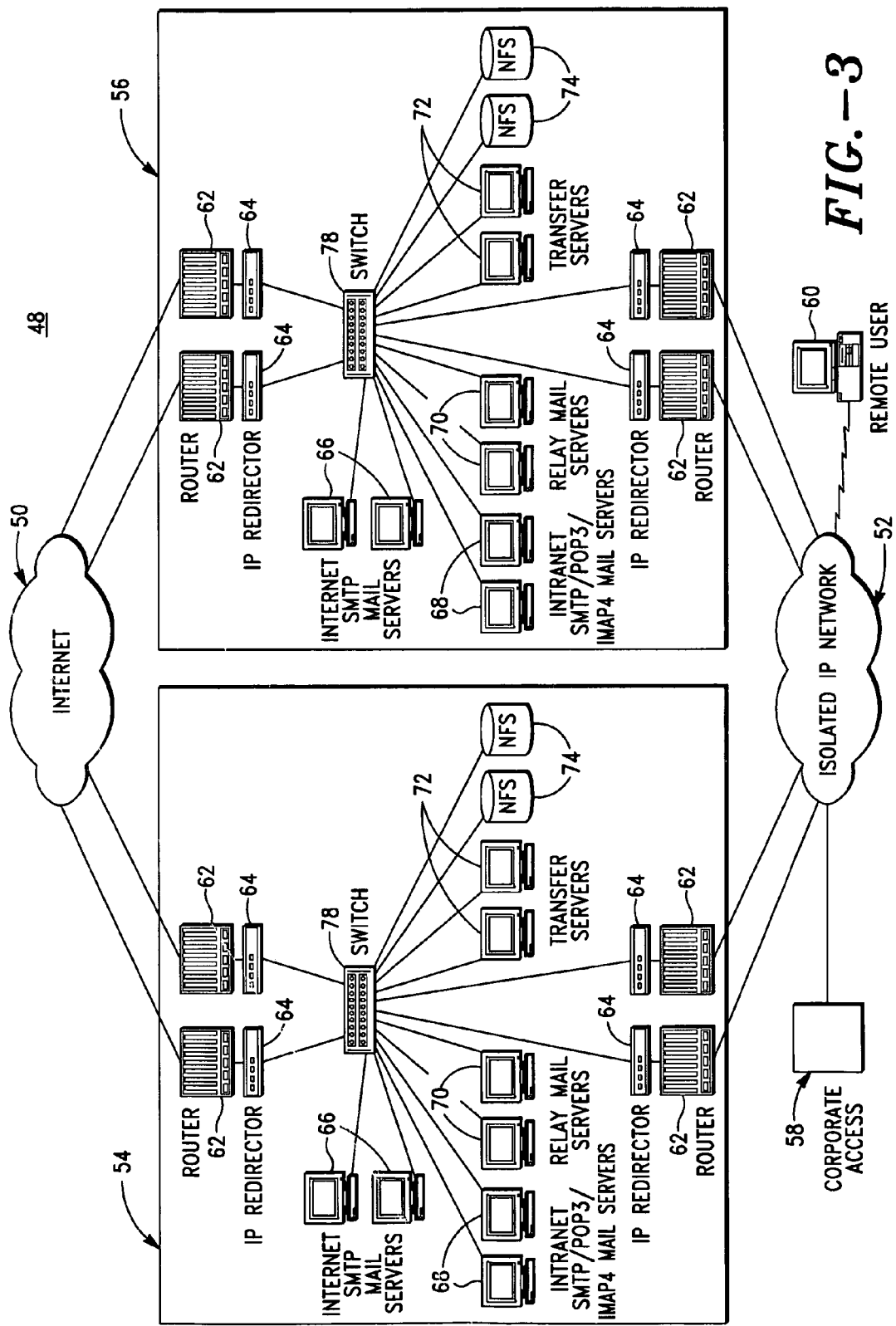
FIG. 3 is a schematic block diagram of an alternate embodiment of a computer network for providing a messaging service in accordance with the present invention.

Referring to FIGS. 1 and 3, networks for providing a messaging service are shown. The messaging service provides reliable or even guaranteed messaging within or between computer networks. A first user sends a message to a destination user. The message includes a mail exchange record or other identifying information to identify a server associated with the destination user. If the destination server or a connection to the destination server is inoperable, the message is re-routed to a relay server in addition to or as an alternative to returning the message to the sender as undeliverable. The relay server provides reliable messaging by attempting to re-route the message to the destination server. Once the destination server becomes operable, the message is provided to the destination server for the destination user.

If attempts to re-route the message from the relay server to the destination server are unsuccessful, the relay server may invoke another messaging server. This other messaging server assumes the original IP address of the original messaging server and acts as a redundant backup to the inoperable destination messaging server. The other messaging server receives the message from the relay server and processes the message for presentation to the recipient (i.e. destination user). The relay server, alone or in conjunction with the other messaging server invoked by the relay server, provides reliable messaging in a computer network.

Referring now to FIG. 1, a schematic block diagram of one embodiment of a computer network for providing a messaging service in accordance with the present invention is shown generally at 10. Network 10 includes DNS server 12, messaging servers 14 and 18, and relay server 16. DNS server 12 operatively directs the message to messaging server 14 or relay server 16 if an outage occurs. The connection may be direct or through one or more intermediate network components or networks. Likewise, relay server 16 operatively connects to messaging servers 14 and 18. Addition of connections, redundant connections, dynamic connections, and/or static connections may be provided.

Network 10 comprises a portion of an entire network or an entire network, such as a local area network or a wide area network. Network 10 may comprise components from different networks operatively connected together. Network 10 may comprise an intranet and may be connected to the Internet. In one embodiment network 10 is operated pursuant to TCP/IP protocols. Other network architectures and protocols may be used.

DNS server 12 operates to determine a destination server for any messaging in network 10. In one preferred embodiment, DNS server 12 comprises a server or other processor operated pursuant to the IP Domain Name System. The user enters a domain name, and DNS server 12 obtains a destination address associated with the domain name. For example, DNS server 12 identifies messaging server 14 as the destination for a message. The destination address is then used to route and send the message. In alternative embodiments, DNS server 12 is not used within network 10, and users input a network useable destination address as part of the messaging. In yet another alternative embodiment, different naming systems or processes for obtaining a destination address from user entered information is provided in place of DNS server 12, such as servers operating pursuant to yet to be developed or different protocols.

The destination messaging server 14 comprises a processor or other network server. In one embodiment, messaging server 14 operates pursuant to one or more of SMTP, POP3, IMAP4 and/or other protocols. In alternative embodiments, messaging server 14 operates pursuant to different protocols. Pursuant to the protocols, messaging server 14 receives the message and makes the message available to a recipient or user. For example, the recipient has access to or logs on to messaging server 14 and may read, forward, reply or perform other messaging functions.

Relay server 16 comprises a network server or other processor for relaying messages. Relay server 16 operatively connects to DNS server 12 for receiving messages that were undeliverable to messaging server 14. Relay server 16 also operatively connects to messaging server 14 for attempting to resend or re-route the message to destination messaging server 14. The connection between relay server 16 and messaging server 14 may comprise the same, part of the same, or an entirely different connection or route than between DNS server 12 and messaging server 14. Relay server 16 may be dedicated to relaying messages or may be used for other purposes, such as message processing pursuant to SMTP or other protocols or other application processing.

Messaging server 18 comprises a network server or processor for message processing. In one embodiment, messaging server 18 operates pursuant to one or more of SMTP, POP3, IMAP4, and/or other protocols. In alternative embodiments different protocols are used. Messaging server 18 may operate pursuant to the same or different protocols than messaging server 14. Messaging server 18 operatively connects to relay server 16.

If attempts by relay server 16 to deliver a message to destination messaging server 14 are unsuccessful, relay server 16 invokes a process that invokes messaging server 18. In this embodiment, messaging server 18 comprises a redundant standby messaging server or redundant operating messaging server. By invoking messaging server 18, relay server 16 designates messaging server 18 as the destination of messages for particular addresses or domain names, such as addresses originally intended for messaging server 14. In other embodiments, relay server 16 notifies a different server of the unavailability of messaging server 14. This other server then invokes messaging server 18 to act as the destination for messages.

Relay server 16 causes messaging server 18 to receive and process message for the recipient. In alternative embodiments, relay server 16 continues to receive messages destined for inoperable messaging server 14 and attempts to re-route the message to messaging server 14 or automatically re-routes the message to already invoked messaging server 18 (i.e., DNS server 12 is not reprogrammed). The recipient signs on to messaging server 18 for messaging serves, such as reading and e-mail message. In one embodiment, the recipient is unaware that a different messaging server 18 is being used.

Figure 2:
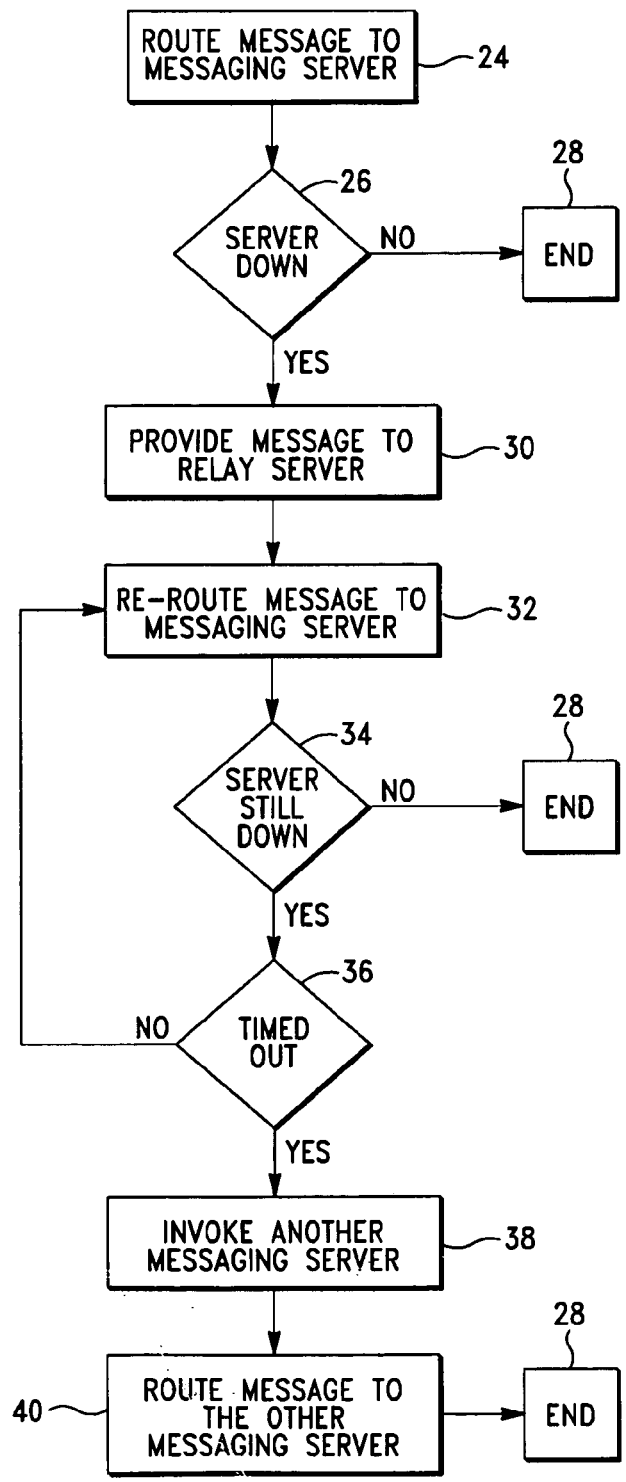
FIG. 2 is a flow chart representing one embodiment of a messaging service method.

Referring to FIG. 2, a flow chart representing one embodiment for performing the message service method of the present invention is shown. In step 24, the message is routed to messaging server 14. Routing is performed pursuant to the domain name system or another protocol for assigning a destination address associated with the messaging server. Once the message is routed to messaging server 14, a determination is made as to whether server 14 is operable in step 26. In one embodiment, the message is sent to messaging server 14 and if no response is received, messaging server 14 is treated as inoperable. In alternative embodiments, a flag or other methodology is used to designate that messaging server 14 is inoperable. If messaging server 14 is not inoperable, then the process ends by sending the message to messaging server 14 for message processing in step 28.

If messaging server 14 is inoperable, the message or an indication of a storage location of the message is provided to relay server 16 in step 30. In one embodiment, the message is provided to relay server 16 without requiring a user to perform another log on and/or without the user receiving a time out or other undeliverable message. As used herein, providing the message is intended broadly to include communicating the storage location or existence of the message. DNS server 12 or another server that handles a particular mail exchange record preferably includes information listing relay server 16 as an alternate or secondary destination. The message is provided to relay server 16 by routing or changing the destination associated with the message to relay server 16. Preferably, the destination address associated with messaging server 14 is also communicated with the message when provided to relay server 16.

In step 32, relay server 16 re-routes the message to messaging server 14. By re-routing the message, relay server 16 attempts to resend the message or attempts to determine the operability of messaging server 14. Relay server 12 may determine the destination address of the messaging server from the message for attempting to re-route the message in step 32. Relay server 16 preferably periodically attempts to re-route the message to messaging server 14. In one embodiment, the re-routing is attempted every 30 seconds, but other time periods or triggers for re-routing may be used.

In step 34, relay server 16 determines whether server 14 is still inoperable. This determination is performed by sending the message to messaging server 14, obtaining network topology information indicating whether messaging server 14 is operable, attempting a communication of any form of data with messaging server 14, or other processes for determining whether server 14 is operational. If server 14 is operational, the message is either received by or sent to messaging server 14 for message processing in step 28.

If server 14 is still inoperable at step 34, the process moves to step 36 where relay server 16 determines the amount of time or number of attempts that re-routing the message to messaging server 14 has been performed. If a threshold amount of time or number of attempts has not been exceeded, relay server 16 continues to re-route the message to messaging server 14 at step 32. If the threshold time or number of attempts has been surpassed, the process proceeds to step 38.

In step 38, relay server 16 or other processor in network 10 invokes another messaging server 18. Other messaging server 18 is invoked by a process running in the data center. That process starts the mail service with the same name and IP address of the original server.

In step 40, the message is routed to the recently invoked messaging server 18. In one embodiment, other messaging server 18 is directed to a memory containing undeliverable messages associated with the inoperable destination server 14. Other messaging server 18 then processes the various undeliverable messages. Preferably, other messaging server 18 is invoked and processes the message without requiring a different log-on by the recipient or an indication that a message is undeliverable to the sender. In another embodiment, relay server 16 routes the message to other messaging server 18 by sending the message to other messaging server 18. As indicated by step 28, other messaging server 18 processes the message. In one embodiment, other messaging server 18 is labeled as the primary server and all subsequent messages are addressed or directed to other messaging server 18 without processing by relay server 16.

Referring to FIG. 3, a schematic block diagram of an alternate embodiment of a computer network for providing a messaging service is shown generally at 48. Network 48 is described in U.S. patent application Ser. Nos. 09/021,466 and 09/021,091, both filed Feb. 10, 1998, the disclosures of which are incorporated herein by reference. Network 48 provides various levels of redundancy for reliable messaging, including devices for relaying undeliverable messages as discussed above.

Network 48 includes two data centers 54 and 56, and may include more data centers. Data centers 54 and 56 are operatively connected by Internet 50 and isolated network 52. Data centers 54 and 56 provide message processing for customers, such as users of corporate access 58 or remote computer 60. Remote computer 60 and corporate access 58 customers are provided messages from others, including via the Internet or via the isolated network 52 by one or both of data centers 54 and 56.

In one embodiment, message delivery may be guaranteed for messages that originate and end through isolated network 52. Isolated network 52 may comprise a local area network or a wide area network, such as a Nation wide IP network. Messages to or from Internet 50 may also be provided with reliable messaging as discussed herein. Isolated network IP 52 is separated from Internet 50 by data centers 54 and 56. In one embodiment, data center 54 is geographically remote from data center 56, such as providing data center 54 in San Jose, Calif. and data center 56 in Relay, Md. In alternative embodiments, only one data center is provided or data center 54 is local to data center 56. Network 48 and isolated network 52 preferably operates pursuant to IP protocols but other protocols may be used.

In one preferred embodiment, data centers 54 and 56 are mirror images of each other (i.e., the same components are provided in both). Data center 54 is able to handle the load and traffic from data center 56 in case of a failure of data center 56 and vice versa. Two of each component in data centers 54 and 56 provides further redundancy for network survivability and scalability. In alternative embodiments, data center 54 comprises different components than data center 56, and/or additional or fewer redundant components are provided in one or both of data centers 54 and 56.

Data centers 54 and 56 each include four routers 62, four redirectors 64, two Internet mail servers 66, two intranet mail servers 68, two relay mail servers 70, two transfer servers 72, two NFS servers 74, and switch 78. Additional or fewer components may be provided. Internet mail servers 66, intranet mail servers 68 and relay servers 70 preferably comprise application processors as discussed in the above-referenced application Ser. No. 09/021,466. Transfer servers 72 preferably comprise utility servers in that application. Two routers 62 and associated redirectors 64 connect to Internet 50, and two routers 62 and associated redirectors 64 connect to isolated network 52. Other components within data centers 54 and 56 operatively interconnect through switch 78 as shown in FIG. 3. Additional interconnections may be provided.

Preferably, each router 62 comprises a Cisco 7507 router (128 MB dram, SONET, serial card and Fast Ethernet cards), but other routers may be used. Using Border Gateway Protocol, version 4 (BGP) in network 48, traffic is routed to a surviving router 62 if one of the routers 62 fails.

Routers 62 accesses a list of various destination addresses associated with data centers 54 and 56 to deny transfers of messages not associated with data centers 54 and 56 and allow messages associated with such addresses to enter data centers 54 and 56. Each pair of routers 62 acts as a bridge for selected traffic to divide Internet 50 and isolated network 52. Routers' 62 access control list is used to deny access to messages from Internet 50 to isolated network 52 unless the messages are transferred by transfer servers 72. Routers 62 associated with Internet 50 allow messages from Internet 50 to be routed only to Internet mail servers 66. Likewise, routers 62 associated with isolated network 52 allow messages to be transferred only to Intranet mail servers 68. In alternative embodiments, greater or lesser access to different components of data centers 54 or 56 for messaging is allowed by routers 62.

Messages from routers 62 are provided to redirectors 64 and distributed evenly among the connected redirectors 64. Redirectors 64 preferably comprise RND WSD proboxes (load balancers), but other load balancing network devices may be used. Redirectors 64 intelligently direct messaging to the most appropriate mail server 66 and 68. The method of directing is preferably configurable, such as the method and system disclosed in U.S. application Ser. No. 09/021,091, referenced above. Other redirection or no redirection may be provided. In this embodiment, the registered address of mail servers 66 and 68 is stored for redirectors 64. As a message enters one of redirectors 64, redirectors 64 accesses the availability of the appropriate mail servers 66 and 68 within that data center 54 or 56 and the remote data center 56 or 54. Redirectors 64 redirect the message to the most available server 66 and 68. In one embodiment, different servers are provided for each type of message, such as SMTP, POP3 or IMAP4. Based on the type of messaging, redirectors 64 redirect the traffic to the designated destination server or any redundant servers providing the appropriate type of messaging as a function of load balancing. If both appropriate mail servers 66 and 68 in the local data center 54 or 56 are unavailable, the message may be redirected to the other data center 56 or 54. Thus, redirectors 64 provide load balancing between redundant servers 66 and 68 within each data center 54 and 56, as well as between data centers 54 and 56.

Switch 78 connects to each redirector 74 in data center 54 or 56. Switch 78 preferably comprises a Cisco catalyst 5500 switch (dual power supply, two supervisor modules, eight Fast Ethernet modules), but other network switches by the same or different manufacturers may be used. Preferably, switch 78 is a high speed internally redundant network switch that supports virtual local area networks. Switch 78 segments traffic. Preferably, switch 78 has redundant power supplies and redundant management modules. If the power supply or management module fails, the redundant device may be processing within 60 seconds. During the 60 second window, redirectors 64 automatically route traffic to the other data center 56 or 54. In one preferred embodiment, servers 66, 68, 70, 72 connect to separate interface cards on the switch 78. If an interface card malfunctions, servers 66, 68, 70, 72 are still accessible, and redirectors 64 automatically remove servers 66, 68, 70 and 72 connected to the failed card from the routing possibilities. These removed servers are added to receive messages as soon as the card has been replaced.

Disk space for various components of data centers 54 and 56 are provided by NFS servers 74. NFS servers 74 preferably comprise Austex NS 7000 servers, but other memory devices may be used. NFS servers 74 may provide fault tolerance, high availability, survivability and scalability in a storage system. NFS servers 74 store messaging, log files, and local server 66, 68, 70 and 72 configurations. As messages are routed through and between data centers 54 and 56 and isolated network 52, a log or record of components of network 48 and times in which the message is passed through those components is recorded for each message.

Preferably, each server 66, 68, 70 and 72 comprises a Sun Ultra 2 server (400 megahertz, 256 MB of RAM, 22 GB drives and 2 Fast Ethernet adapters), but other network servers may be used. As shown in FIG. 3, each server 66, 68, 70 and 72 provides one type of processing. In alternative embodiments, the servers apply the processing shown as well as other processing. In one preferred embodiment, each process is run on two or more servers to provide redundancy. In this embodiment, each server operates in real time, so the processing burden is balanced between two or more servers.

Internet mail servers 66 provide message processing pursuant to the SMTP protocol or other protocols for receiving messages from Internet 50 destined for a customer or a user of data centers 54 or 56. Messages to or from Internet 50 are processed by Internet mail server 66.

Intranet mail servers 68 process messages pursuant to SMTP, POP3, and IMAP4 protocols, but other protocols may be used. The redundant, load balanced intranet mail servers 68 allow a customer connected through isolated network 52 access to messages.

Transfer servers 72 provide for the transfer of messages between isolated network 52 and Internet 50. Transfer servers 72 are provided for security so that isolated network 52 is maintained separate from components of data centers 54 and 56 associated with Internet 50. Messages destined for Internet 50 created by a user of isolated network 52 are provided to intranet mail server 68. Likewise, messages from Internet 50 destined for users of isolated network 52 are provided to Internet servers 66. Internet and intranet mail servers 66 and 68 store these messages prior to transfer. Transfer services automatically or periodically pick up, copy or otherwise indicate that the messages may be passed through routers 62 to the appropriate destination. For example, transfer servers 72 copy messages from Internet server 66 to intranet servers 68 and vise versa. Copying may be performed at the same time or at different times. In one embodiment, this process is performed at a predetermined time interval, such as every 30 seconds. Other time periods may be used. In alternative embodiments, transfer servers 72 designate messages stored in NFS server 74 for transfer between Internet and intranet mail servers 66 and 68.

Messages transferred between Internet and intranet mail servers 66 and 68 are logged by transfer server 72. The log includes message header information and date and time of transfer. The log is stored by NFS server 74. For messages transferred from Internet mail server 66 to intranet mail server 68, the messages are marked as delivered for Internet mail server 66. Likewise, messages transferred from intranet mail server 68 to Internet mail server 66 are marked as delivered for intranet mail server 68. The transferred messages marked as deleted are saved in an archival area by NFS server 74. In one embodiment, they are saved for 15 to 30 days, but other time periods or triggering events may be used. The archives managed by NFS server 74 may be deleted or further archived on another storage device and deleted from NFS server 74.

Load balanced relay servers 70 provide further reliability for sending and receiving messages as discussed above. In one embodiment, guaranteed delivery for messages generated by users of and destined for users of isolated network 52 is provided. In alternative embodiments, relay mail servers 70 also provide guaranteed delivery of messages received by data centers 54 or 56 from Internet 50 that are destined for users of isolated network 52. Routers 62 or DNS servers for Internet 50 or isolated network 52 provide an address for a destination mail server, such as Internet or intranet mail server 66 and 68, associated with a sender provided domain name. DNS server preferably have multiple addresses or routing points associated with each domain name for customers of data center 54 and 56. The primary address is one of the intranet or Internet mail servers 66 or 68. The secondary reference is one of relay mail servers 70. For example, a sender creates a message for joe@companyxyz.com. The mail exchange record for company xyz.com addresses the message to data center 54 or 56 or a server in data center 54 or 56. If the data center 54 or 56 or server within data center 54 or 56 is not operational or down due to network outage, power outage, etc., the DNS server processing company xyz's messages includes a secondary address associated with relay servers 70. Preferably, addressed relay server 70 is in data center 54 or 56 remote from the primary address data center 54 or 56 or server 66 or 68. For example, relay servers 70 of data center 56 operate to relay messages originally destined for data center 54 and vise versa.

Acting as an automated disaster recovery mail box, relay servers 70 receive messages as a secondary destination when all or a primary one of Internet or intranet mail servers 66 and 68 associated with a particular customer or mail exchange record are inoperable. One of relay servers 70 receives the message or receives responsibility for mail stored by NFS server 74. Relay server 70 makes periodic attempts to re-route the message to the primary or other appropriate destination Internet or intranet mail server 66 and 68. The attempts may be made every 30 to 60 seconds, other time periods or based on other triggers. In one preferred embodiment, messages re-routed by relay server 70 to original destination mail server 66 or 68 are routed over one of at least two redundant routes or different routes than originally used to send the message to destination mail server 66 or 68.

If one or more attempts to re-route and send a message to original destination server 66 or 68 by relay server 70 are unsuccessful, relay server 70 may invoke a process whereby another Internet or intranet mail server 66 or 68 as appropriate for processing the message. In alternative embodiments, relay server 70 continues to attempt to re-route the message to original destination mail server 66 or 68, archives the message and routes it back to the sender as undeliverable or performs some other process.

Preferably relay server 70 is in a different data center than the original destination mail server 66 or 68. In this embodiment, relay server 70 invokes an Internet or intranet mail server 66 or 68 in the same data center 54 or 56 as relay server 70. In alternative embodiments, relay server 70 invoke; a process to create an intranet or Internet mail server 66 or 68 in the remote data enter 54 or 56. Once the Internet or intranet mail server 66 or 68 is invoked, relay server 70 re-routes and sends messages associated with the appropriate mail exchange record or customer to that server. In one embodiment, the routers and domain name system servers are changed so that the invoked server is listed as the primary server for that destination. In alternative embodiments, relay server 70 continues to relay messages to the invoked server as long as the original server is inoperable.

In one embodiment, messages destined for a user of isolated network 52 are replicated to each data center 54 and 56, such as copying new messages to NFS servers 74 in both data centers 54 and 56. Preferably, the replication is performed periodically as disclosed in U.S. application Ser. No. 09/160,389, filed Sep. 25, 1998. If a major disaster occurs at one of data centers 54 or 56, the mail exchange record for a customer is changed to surviving data center 54 and 56. Internet and intranet mail servers 66 and 68 are invoked to provide processing for messages in surviving data center 54 or 56. The Internet and intranet mail servers 66 and 68 are provided with an indication of the location of the stored or backed-up messages in NFS servers 74. In one embodiment, relay server 70 routes all outstanding messages, including those backed up by NFS server 74 and any messages currently being handled by relay server 70 to the new Internet or intranet mail servers 66 or 68 as appropriate.

It should be understood that many changes and modifications can be made to the embodiments described above. For example, different network equipment, different processes after attempting to re-route messages, and different triggers (whether time based or not time based) may be used. It is therefore intended that the foregoing detailed description be understood as an illustration of the presently preferred embodiments of the invention, and not as a definition of the invention. It is only the following claims, including all equivalents, that are intended to define the scope of the invention.

The invention claimed is:

1. A method for providing a messaging service on a computer network, the method comprising the steps of:
   (a) routing a message to a messaging server;
   (b) providing the message to a relay server when the messaging server is inoperable such that the message is undeliverable to the messaging server;
   (c) re-routing the message from the relay server to the messaging server if the messaging server becomes operational; and
   (d) invoking another messaging server if the messaging server in step (c) does not become operational.

2. The method of claim 1 further comprising:
   (e) routing the message to the other messaging server of step (d).

3. The method of claim 2:
   further comprising (f) storing the message; and
   wherein step (e) comprises changing server information of the stored message.

4. The method of claim 1 wherein step (c) comprises periodically attempting delivery of the message from the relay server to the messaging server.

5. The method of claim 1 further comprising:
   (d) sending the message to the messaging server in response to step (c).

6. The method of claim 2 further comprising:
   (f) sending the message to the other messaging server in response to step (e).

7. A computer network for providing a messaging service, the network comprising:
   a messaging server;
   a DNS server operable to route a message to the messaging server;
   a relay server operably connected to the DNS server and the messaging server, the DNS server operable to provide the message to the relay server when the messaging server is inoperable such that the message is undeliverable to the messaging server;
   wherein the relay server is operable to re-route the message from the relay server to the messaging server if the messaging server becomes operational; and
   another messaging server, the other messaging server invoked by the relay server if the messaging server does not become operable such that the message is undeliverable to the messaging server in response to the re-routing.

8. The network of claim 7 wherein the relay server is operable to route the message to the other messaging server.

9. The network of claim 8 further comprising:
   a storage device operably connected to the relay server and the other messaging server, the message being stored in the storage device; and
   wherein the relay server is operable to change server information of the stored message to route the message to the other messaging server.

10. The network of claim 7 wherein the relay server is operable to periodically attempt delivery of the message from the relay server to the messaging server.

11. The network of claim 7 wherein the relay server is operable to send the message to the messaging server in response to the re-routing.

12. The network of claim 8 wherein the relay server is operable to send the message to the other messaging server in response to routing the message to the other messaging server.

13. The network of claim 7 wherein the messaging server and the relay server are within a first data center.

14. The network of claim 7 wherein the messaging server and the other messaging server are in first and second data centers, the first data center remote from the second data center.

15. The network of claim 7 wherein the relay server is operable to invoke a process to create another messaging server with a same name and IP address.

* * * * *